2,772,475

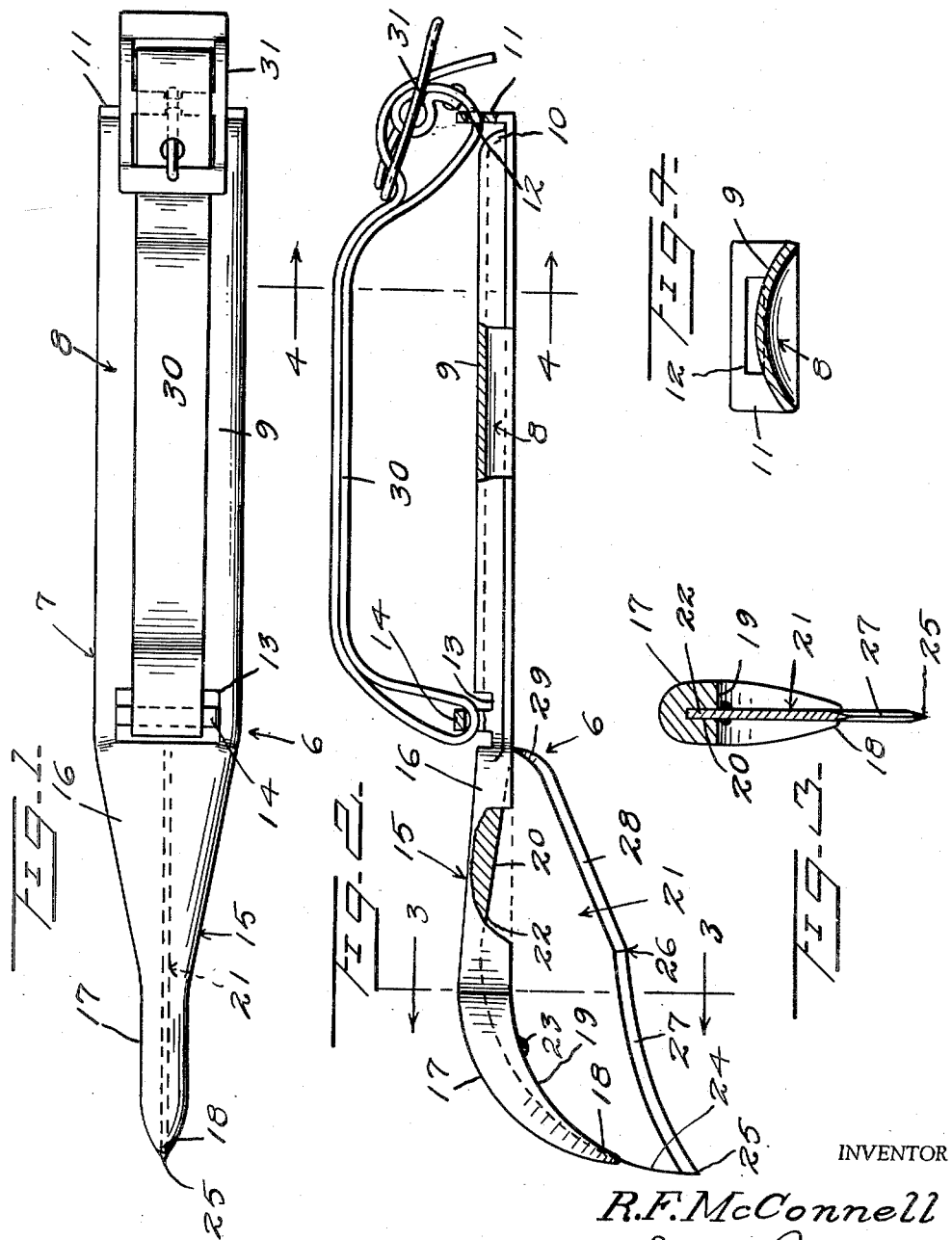

GRAPEVINE AND TWINE CUTTING KNIFE

Robert F. McConnell, Parlier, Calif.

Application August 6, 1954, Serial No. 448,314

4 Claims. (Cl. 30—298)

This invention relates to a novel knife adapted to be supported on a part of the hand leaving the thumb and index finger free for use in grasping a bunch of grapes the stem of which is to be cut by the knife blade.

Another object of the invention is to provide a knife of unique construction adapted to be carried on the hand the blade of which is so disposed that it may be effectively employed for cutting the twine commonly used for suspending large bunches of grapes from wires prior to pruning and which twine must be removed before harvesting of the grape bunches can be accomplished.

A further object of the invention is to provide a knife of the aforedescribed character which may be conveniently supported on a part of the hand and with the blade properly disposed so that a part of the hand supporting the knife can readily actuate the blade to accomplish a cutting stroke and while another part of the hand, constituting the thumb and index finger, are utilized for holding the bunch of grapes being harvested.

Various other objects and advantages of the invention will hereinafter become more fully apparent from the following description of the drawing, illustrating a presently preferred embodiment thereof, and wherein:

Figure 1 is a top plan view of the knife on an enlarged scale relative to the actual size thereof;

Figure 2 is a side elevational view thereof, partly in longitudinal section;

Figure 3 is an enlarged cross sectional view taken substantially along a plane as indicated by the line 3—3 of Figure 2, and Figure 4 is an enlarged cross sectional view taken substantially along a plane as indicated by the line 4—4 of Figure 2 and with the strap omitted.

Referring more specifically to the drawing, the grapevine and twine cutting knife in its entirety and comprising the invention is designated generally 6 and includes a body portion, designated generally 7, formed of metal, preferably wrought iron.

The body portion 7 includes an elongated relatively wide handle part 8, constituting one end thereof, which is transversely bowed as seen in Figures 2 and 4 so that the upper surface thereof, constituting the hand engaging part and designated 9, is convex in cross section. The handle 8 adjacent its outer or rear end is flattened as seen at 10, and is provided with a flattened upturned extension 11 in which is formed a transversely elongated slot or opening 12. The handle 8 is relatively thin and is concavoconvex in cross section. Adjacent its opposite, forward end, the handle 8 is provided with a relatively wide transversely extending opening 13 which extends to adjacent the side edges of said handle. An upwardly offset crossbar or bail 14, of a width substantially less than the width of the opening 13, extends longitudinally thereof and is spaced from the longitudinal edges of said opening and is upwardly offset with respect thereto. The downturned ends of the crossbar 14 preferably merge integrally with portions of the handle 8 constituting the ends of the opening 13 or may be suitably joined thereto as by welding.

The other forward end of the body portion 7 constitutes a blade supporting head, designated generally 15, and forms an integral extension of the forward end of the handle part 8, in which the opening 13 is formed. The inner or rear end of the head 15, which merges with the inner or forward end of the handle 8, is of substantially greater thickness than said handle 8. The head 15 includes an inner end portion 16 which extends from the forward end of the handle 8 and which, as previously stated, is substantially thicker than said handle. The head portion 16 tapers in width from the handle 8 to a point substantially intermediate of the ends of the head 15 and said portion 16 constitutes substantially a straight extension of the handle 8 which increases in thickness in a direction away from the handle, as illustrated in Figure 2. The head part 16 at its forward transversely restricted end merges with a forward or outer head part 17 which extends forwardly and is curved downwardly from the head part 16 and which diminishes in thickness toward the outer free end thereof. Likewise, the outer free end 18 of the head part 17 tapers in width to substantially a point, as seen in Figure 1, when viewed from above, and is disposed substantially below the level of the inner head part 16 and handle 8, as best illustrated in Figure 2. The underside of the head 15, designated 19, is provided with a relatively narrow groove 20 which extends substantially from end-to-end thereof and which is substantially equally spaced from the side edges of the head 15. The groove 20 is of substantial depth, intermediate of the ends of the head 15, as seen in Figure 2, and diminishes in depth toward the inner and outer ends of the head.

The head 15 supports a cutting blade, designated generally 21, formed of a good grade of tempered knife steel. The blade 21 has a back edge portion 22 of proper thickness and shape to fit snugly in the groove 20 and flush against the bed of said groove and which engages in the groove from end-to-end thereof. The rear part of the groove 20 and the complementary back edge portion of the rear blade part 22 are substantially straight, as seen in Figure 2, while the bed of the forward part of the groove 20 and the back edge of the forward part of the blade portion 22 which abuts thereagainst are longitudinally bowed and substantially conform to the convex longitudinal curvature of the upper side of the head portion 17. The back portion 22 of the blade 21 may be secured in any suitable manner in the groove 20 of the head 15, as by spot welding, as indicated at 23. The forward end of the back edge of the blade 21 includes a convexly bowed portion 24 which extends downwardly from the forward end 18 of the head. The lower end of the back edge portion 24 constitutes a part of the pointed forward end 25 of the blade 21. The bottom edge of the blade 21 is beveled on opposite sides thereof and from end-to-end of the blade and provides a cutting edge, designated generally 26, having a forward part 27, constituting substantially one half of said cutting edge which is slightly bowed concavely, and the forward end of which merges with the lower end of the back edge portion 24 to form the point 25. The other approximately rear half 28 of the cutting edge 26 is substantially straight except at its rear end which is curved upwardly toward the inner end of the head 15, as seen at 29.

A strap or other flexible member 30, having a buckle 31 at one end thereof, is passed forwardly through the opening 12 and thence forwardly under the crossbar or bail 14. The strap 30 is then folded back upon itself over the crossbar or bail 14 and over the aforementioned strap portion which extends between the parts 11 and 14, and the free end of the strap is adjustably connected to the buckle 31. The buckle 31 is located above and adjacent the upturned rear end portion 11 and the strap end engaged therewith may be adjustably connected to the buckle for tightening or loosening the strap to provide a desired spacing between the top surface 9 of the handle and the two plies of the strap 30, as seen in Figure 2, so that the strap 30 will fit snugly over the hand.

The middle finger, ring finger and little finger are inserted between the handle surface 9 and said two plies of the strap 30 and, as previously stated, the strap 30 is adjusted to fit tightly around the fingers to support the knife 6 thereon. Thus, the thumb and index finger are left free to be employed for grasping a bunch of grapes, for example, for holding the grapes while the cutting edge 26 is utilized for cutting the stem. The blade 21 is disposed in a plane substantially perpendicular to the plane of the body member 7 and accordingly may be conveniently utilized, with the knife applied to the three fingers as previously described, for cutting twine securing vines or stems to supporting wires by passing the blade 21 between the vines or stems and the wire.

Various modifications and changes are contemplated and may obviously be resorted to, without departing from the spirit or scope of the invention as hereinafter defined by the appended claims.

I claim as my invention:

1. A knife of the character described adapted to be attached to and supported on the fingers, comprising an elongated body portion having a rear end forming a handle, said handle being provided with upstanding strap engaging portions adjacent the ends thereof, an adjustable strap connected to and extending between said strap engaging portions and disposed over the handle and lengthwise thereof, the other end of said body portion comprising an elongated blade supporting head, said head having an underside provided with a groove extending substantially from end-to-end thereof and opening outwardly of said underside, a cutting blade having a back edge portion snugly fitting in said groove, means securing said blade to the head, and said blade having a sharpened bottom edge extending substantially from end-to-end thereof and disposed beneath and spaced from the underside of said head, said head having an inner end merging with the forward inner end of the handle and of a thickness substantially greater than the thickness of said handle, said head diminishing in width from the handle to a point substantially intermediate of its ends and increasing in thickness in a direction away from the handle, said aforementioned inner end of the head forming a substantially straight extension of the handle, the other outer end of said head being relatively narrow and being curved outwardly and downwardly relative to the inner end of the head and having a tapered outer end portion.

2. A knife of the character described adapted to be attached to and supported on the fingers, comprising an elongated body portion having a rear end forming a handle, said handle being provided with upstanding strap engaging portions adjacent the ends thereof, an adjustable strap connected to and extending between said strap engaging portions and disposed over the handle and lengthwise thereof, the other end of said body portion comprising an elongated blade supporting head, said head having an underside provided with a groove extending substantially from end-to-end thereof and opening outwardly of said underside, a cutting blade having a back edge portion snugly fitting in said groove, means securing said blade to the head, and said blade having a sharpened bottom edge extending substantially from end-to-end thereof and disposed beneath and spaced from the underside of said head, said groove diminishing in depth from substantially intermediate of the ends of the head toward each end thereof and having a bed portion including a substantially straight rear part and a concavely bowed forward part.

3. A knife as in claim 2, the back edge of said blade being shaped to comformably seat in the bed of said groove and having a forward end portion depending from the tapered forward end of the head and merging with the forward end of said cutting edge to form a point.

4. A knife as in claim 3, the cutting edge of said blade including a concavely bowed forward part extending rearwardly from the point, and said cutting edge including a substantially straight rear part extending rearwardly from the concavely bowed forward part and disposed at an incline upwardly and toward the forward end of the handle, said inclined rear part of the cutting edge terminating in an upwardly curved rear end portion located adjacent the rear end of the blade.

References Cited in the file of this patent

UNITED STATES PATENTS

| | | |
|---|---|---|
| D. 85,503 | Xardell | Nov. 3, 1931 |
| 472,006 | Walker et al. | Mar. 29, 1892 |
| 680,030 | Emans | Aug. 6, 1901 |
| 681,176 | Albach | Aug. 27, 1901 |
| 998,046 | Stewart | July 18, 1911 |
| 1,013,844 | Owens | Jan. 2, 1912 |
| 1,147,665 | Warren | July 20, 1915 |
| 1,620,133 | Randolph | Mar. 8, 1927 |